United States Patent
Honma et al.

(10) Patent No.: US 7,760,762 B2
(45) Date of Patent: Jul. 20, 2010

(54) BANDWIDTH CONTROLLING METHOD AND NODE APPARATUS FOR A RING-BASED NETWORK

(75) Inventors: Hiroyuki Honma, Kawasaki (JP); Satoru Saitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 862 days.

(21) Appl. No.: 11/330,066

(22) Filed: Jan. 12, 2006

(65) Prior Publication Data

US 2007/0070923 A1   Mar. 29, 2007

(30) Foreign Application Priority Data

Sep. 28, 2005   (JP) .............................. 2005-282096

(51) Int. Cl.
- H04J 3/16 (2006.01)
- H04L 12/28 (2006.01)
- G01R 31/08 (2006.01)

(52) U.S. Cl. .................. 370/468; 370/222; 370/426

(58) Field of Classification Search .................. 370/216, 370/217, 222, 223, 224, 229, 231, 232, 242, 370/244, 245, 249, 250, 252, 254, 258
See application file for complete search history.

(56) References Cited

U.S. PATENT DOCUMENTS

| | | | | |
|---|---|---|---|---|
| 4,679,191 A | * | 7/1987 | Nelson et al. ............... | 370/355 |
| 6,400,687 B1 | * | 6/2002 | Davison et al. ............. | 370/236 |
| 6,922,390 B1 | * | 7/2005 | Chapman et al. ............ | 370/229 |
| 7,088,679 B2 | * | 8/2006 | Behzadi ...................... | 370/230 |
| 2003/0108029 A1 | * | 6/2003 | Behzadi ...................... | 370/351 |
| 2004/0190445 A1 | * | 9/2004 | Dziong et al. ............... | 370/225 |
| 2006/0062161 A1 | * | 3/2006 | Tang et al. .................. | 370/258 |

FOREIGN PATENT DOCUMENTS

JP   2004-289799   10/2004

* cited by examiner

*Primary Examiner*—Hanh Nguyen
(74) *Attorney, Agent, or Firm*—Fujitsu Patent Center

(57) ABSTRACT

The present invention discloses a method for controlling a physical bandwidth of a ring-based network by employing a ring application of a data link layer that operates in a physical layer. The method includes the steps of a) requesting each of a plurality of node apparatuses included in the ring-based network to confirm whether the bandwidth can be changed, b) instructing each node of the apparatuses to prepare for the bandwidth change upon receiving a confirmation that the bandwidth can be changed, c) reporting that the preparation for the bandwidth change is completed, and d) changing the bandwidth by using a bandwidth changing function of the ring application upon receiving the report of the completion of the preparation for the bandwidth change.

10 Claims, 14 Drawing Sheets

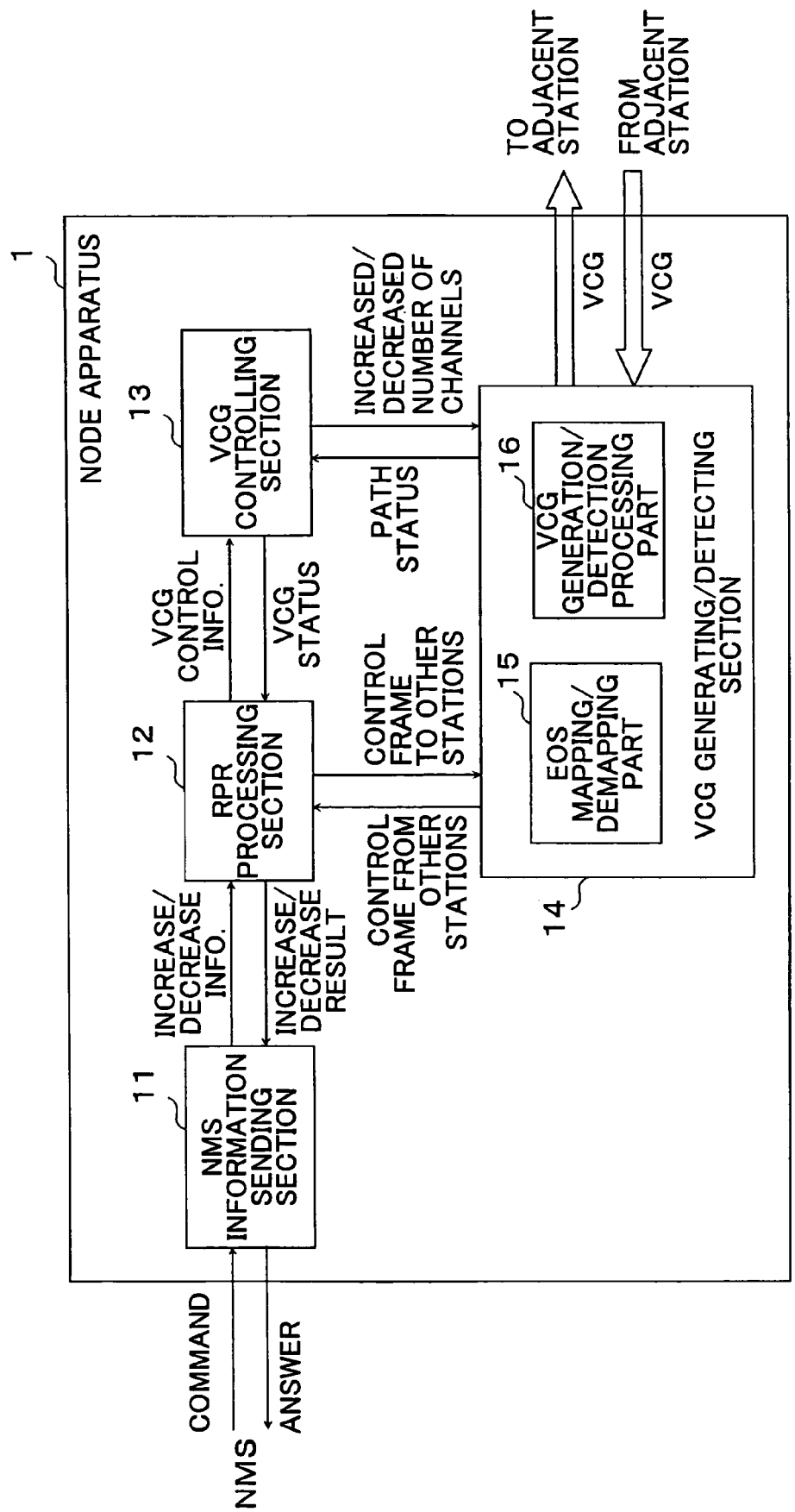

FIG.3

| VALUE | NAME | DESCRIPTION |
|---|---|---|
| $01_{16}$ | CT_STATION_ATD | STATION ATTRIBUTE DISCOVERY FRAME |
| $02_{16}$ | CT_TOPO_PROT | TOPOLOGY AND PROTECTION PROTOCOL FRAME |
| $03_{16}$ | CT_TOPO_CHKSUM | TOPOLOGY AND PROTECTION CHECKSUM FRAME |
| $04_{16}$ | CT_LRTT_REQ | LINK ROUND TRIP TIME MEASUREMENT REQUEST FRAME |
| $05_{16}$ | CT_LRTT_RSP | LINK ROUND TRIP TIME MEASUREMENT RESPONSE FRAME |
| $06_{16}$ | CT_FDD | FAIRNESS DIFFERENTIAL DELAY FRAME |
| $07_{16}$ | CT_OAM_ECHO_REC | OAM ECHO REQUEST FRAME |
| $08_{16}$ | CT_OAM_ECHO_RSP | OAM ECHO RESPONSE FRAME |
| $09_{16}$ | CT_OAM_FLUSH | OAM FLUSH FRAME |
| $0A_{16}$ | CT_OAM_ORG | OAM ORGANIZATION SPECIFIC FRAME |
| — | — | RESERVED | byte
1 ttl
1 baseControl
6 da
6 sa
1 ttlBase
1 extendedControl
2 hec
1 controlType
1 controlVersion
n controlDateUnit
4 fcs

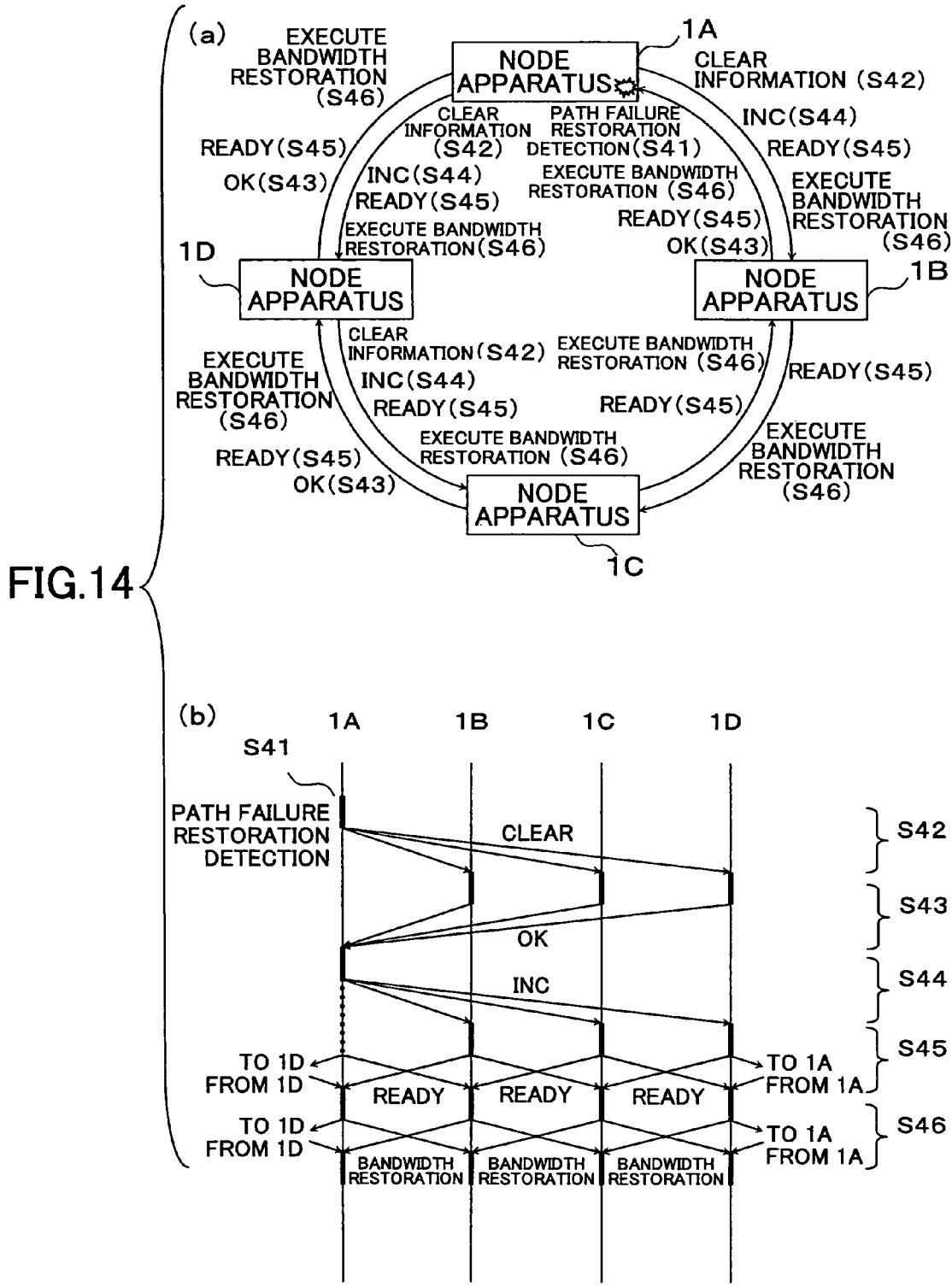

US 7,760,762 B2

BANDWIDTH CONTROLLING METHOD AND NODE APPARATUS FOR A RING-BASED NETWORK

BACKGROUND OF THE INVENTION

1. Field of the Invention

The present invention generally relates to a bandwidth controlling method and a node apparatus station for a ring-based network.

2. Description of the Related Art

FIG. 1 shows an exemplary configuration of a ring-based network in which RPR (Resilient Packet Ring) is applied over a SONET (Synchronous Optical Network). In FIG. 1, by providing SONET path in two directions between each of the adjacently disposed node apparatuses (RPR stations) 1A-1D, all of the the node apparatuses 1A-1D can be connected by a pair of bidirectional SONET paths of equal bandwidth. An RPR ring is provided over this SONET path.

A technology for managing/controlling the bandwidth and flow of an RPR network is disclosed in Japanese Laid-Open Patent Application NO. 2004-289799.

With these kinds of ring-based networks, there is a demand to increase/decrease the physical bandwidth without having to affect the traffic (paths being in use). Nevertheless, such ring-based networks have the following disadvantages.

First, in a case of changing the ring bandwidth of the RPR network (RPR over SONET) from an upper level NMS (Network Management System), it is necessary for the SONET path to be removed in order to reset the bandwidth. This causes a state of signal disconnection for a maximum period of approximately 30 minutes (although this may vary depending on the number of nodes in the network).

Second, although the changing of a SONET path between a pair of adjacent nodes (i.e. changing of a single span) may be performed in a short period of time, the RPR requires the bandwidth for all spans in the ring network to be changed simultaneously since any inconsistency in bandwidth among the spans may cause an abnormality in the performance of the RPR. Therefore, the bandwidth of the ring cannot be changed with an RPR application.

Furthermore, in a case where a failure occurs in the SONET path, an RPR protection function switches the RPR regardless of whether the error has little influence with respect to a bandwidth guarantee service. This leads to a problem of inefficient use of bandwidth.

SUMMARY OF THE INVENTION

It is a general object of the present invention to provide a bandwidth controlling method and a node apparatus station for a ring-based network that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a bandwidth controlling method and a node apparatus station for a ring-based network particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method for controlling a physical bandwidth of a ring-based network by employing a ring application of a data link layer that operates in a physical layer, the method including the steps of: a) requesting each of a plurality of node apparatuses included in the ring-based network to confirm whether the bandwidth can be changed; b) instructing each node of the apparatuses to prepare for the bandwidth change upon receiving a confirmation that the bandwidth can be changed; c) reporting that the preparation for the bandwidth change is completed; and d) changing the bandwidth by using a bandwidth changing function of the ring application upon receiving the report of the completion of the preparation for the bandwidth change.

In the method for controlling a physical bandwidth of a ring-based network by employing a ring application of a data link layer that operates in a physical layer according to an embodiment of the present invention, the request of step a) may be executed in accordance with a command from a network management system connected to the ring-based network, wherein the completion of the bandwidth change in step d) may be reported to the network management system.

In the method for controlling a physical bandwidth of a ring-based network by employing a ring application of a data link layer that operates in a physical layer according to an embodiment of the present invention, the bandwidth change may include an increase of the bandwidth, wherein the bandwidth can be increased if the bandwidth requested to be increased is less than the bandwidth that is unused in the ring-based network, wherein the bandwidth cannot be increased if the bandwidth requested to be increased is greater than the bandwidth that is unused in the ring-based network.

In the method for controlling a physical bandwidth of a ring-based network by employing a ring application of a data link layer that operates in a physical layer according to an embodiment of the present invention, the bandwidth change may include a decrease of the bandwidth, wherein the bandwidth can be decreased if it is determined that predetermined bandwidth will be available after the bandwidth is decreased, wherein the bandwidth cannot be decreased if it is determined that the predetermined bandwidth will be unavailable after the bandwidth is decreased.

In the method for controlling a physical bandwidth of a ring-based network by employing a ring application of a data link layer that operates in a physical layer according to an embodiment of the present invention, the request of step a) may be executed when a failure is detected in the ring-based network.

In the method for controlling a physical bandwidth of a ring-based network by employing a ring application of a data link layer that operates in a physical layer according to an embodiment of the present invention, an RPR switching function may be activated in a case where the bandwidth cannot be decreased when the failure is detected in the ring-based network.

In the method for controlling a physical bandwidth of a ring-based network by employing a ring application of a data link layer that operates in a physical layer according to an embodiment of the present invention, the request of step a) may be executed when a recovery of a failure is detected in the ring-based network.

In the method for controlling a physical bandwidth of a ring-based network by employing a ring application of a data link layer that operates in a physical layer according to an embodiment of the present invention, the physical bandwidth of the ring-based network may include at least one of a SONET bandwidth and a SDH bandwidth.

In the method for controlling a physical bandwidth of a ring-based network by employing a ring application of a data link layer that operates in a physical layer according to an embodiment of the present invention, the bandwidth changing function of the ring application may include an RPR function, wherein the control information may include an RPR control frame.

Furthermore, the present invention provides a node apparatus used for controlling a physical bandwidth of a ring-based network by employing a ring application of a data link layer that operates in a physical layer, the node apparatus including: a requesting part for requesting another node apparatus included in the ring-based network to confirm whether the bandwidth can be changed; an instructing part for instructing the other node apparatus to prepare for the bandwidth change upon receiving a confirmation that the bandwidth can be changed; a reporting part for reporting that the preparation for the bandwidth change is completed; and a changing part for changing the bandwidth by using a bandwidth changing function of the ring application upon receiving the report of the completion of the preparation for the bandwidth change.

Other objects and further features of the present invention will be apparent from the following detailed description when read in conjunction with the accompanying drawings.

BRIEF DESCRIPTION OF THE DRAWINGS

FIG. 2 is a schematic view showing an exemplary configuration of a node apparatus according to an embodiment of the present invention;

FIG. 3 is a schematic view showing an exemplary format of a control frame;

FIG. 14 is a schematic view for describing an exemplary process of restoring the bandwidth of a ring network when recovering from a failure in a path of the network.

DESCRIPTION OF THE PREFERRED EMBODIMENTS

In the following, embodiments of the present invention will be described with reference to the accompanying drawings.

Figure 1:
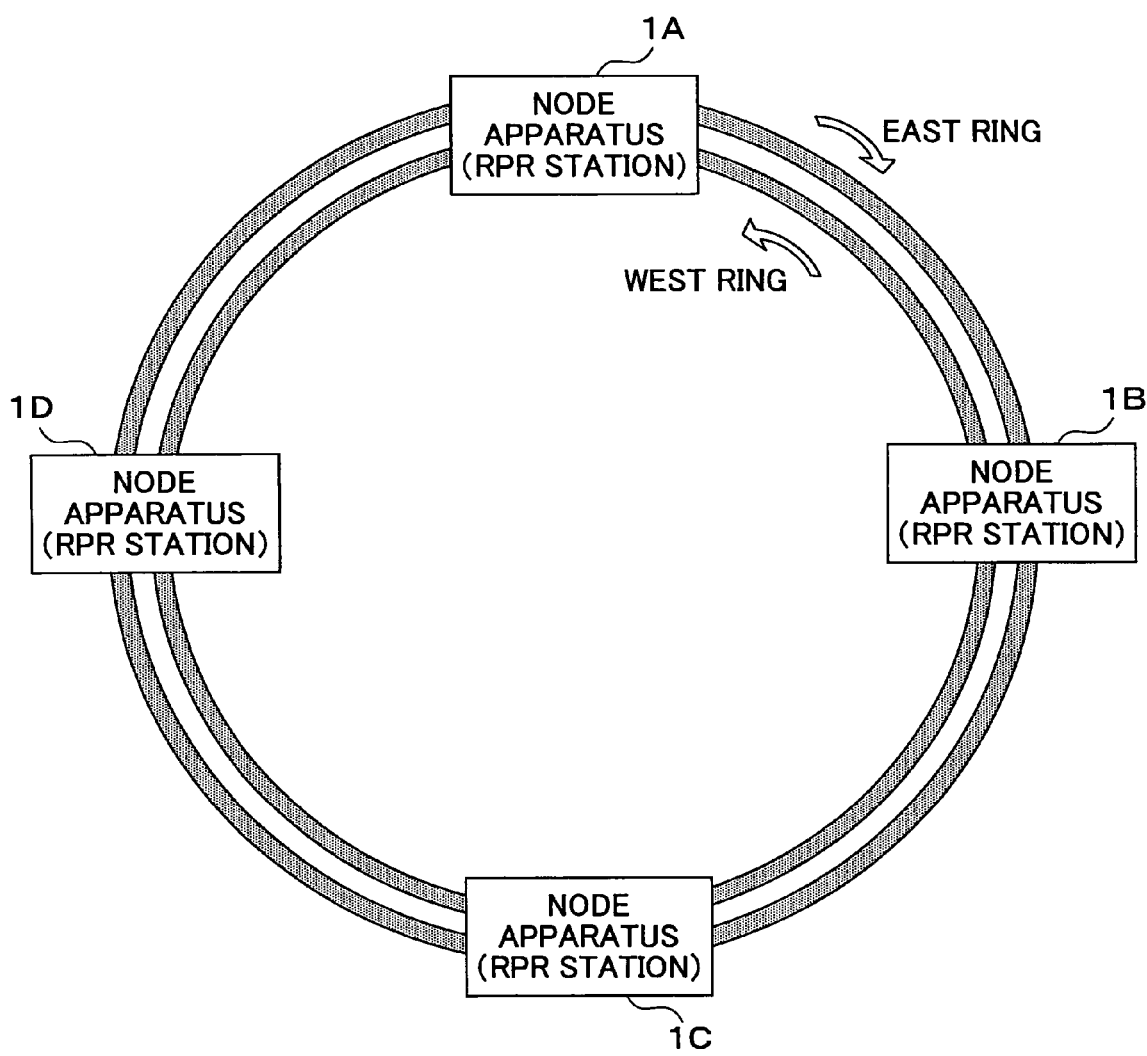
FIG. 1 is a schematic view showing an exemplary configuration of a ring-based network.

FIG. 2 shows an exemplary configuration of a node apparatus 1 according to the first embodiment of the present invention. In FIG. 1, the node apparatus 1 includes an NMS information sending section 11, an RPR processing section 12, a VCG (Virtual Concatenation Group) controlling section 13, and a VCG generating/detecting section 14 (which includes an EOS mapping/demapping part 15 and a VCG generation/detection processing part 16).

The NMS information sending section 11 has a function of sending bandwidth increase/decrease information to the RPR processing section upon receiving a command to increase/decrease the bandwidth (bandwidth increase/decrease command) from an upper level NMS, and a function of sending an answer to the NMS upon receiving a bandwidth increase/decrease result and a VCG status from the RPR processing section 12.

In a case where the RPR processing section 12 receives the bandwidth increase/decrease information from the NMS information sending section 11 (i.e. in a case where the node apparatus 1 is the master station), the RPR processing section 12 has a function of conducting a predetermined process for increasing/decreasing the bandwidth and sending a bandwidth increase/decrease result and a VCG status to the NMS information sending section 11. Furthermore, the RPR processing section 12 also has a function of generating a control frame and sending the control frame to the VCG generating/detecting section 14 as well as receiving a control frame of another node apparatus from the VCG generating/detecting section 14. Furthermore, the RPR processing section 12 also has a function of sending the received bandwidth increase/decrease information (VCG control information) to the VCG controlling section 13 and determining whether to increase/decrease the bandwidth according to a VCG status obtained from the VCG controlling section.

The VCG controlling section 13 has a function of controlling the increase/decrease of bandwidths in the VCG generating/detecting section 14 in accordance with the bandwidth increase/decrease information from the RPR processing section 12, and obtaining a VCG status from the VCG generating/detecting section 14.

The EOS mapping/demapping part 15 in the VCG generating/detecting section 14 has a function of mapping/demapping various parameters (e.g. EOS (End Of Sequence) serving to designate the path which is to be a member of the VCG) to the overhead information. The VCG generation/detection processing part 16 in the VCG generating/detecting section 14 has a function of sending/receiving control frames, sending/receiving VCG frames, and detecting/reporting VCG status.

FIG. 3 shows an exemplary format of a control frame generated by the RPR processing section 12 (defined in IEEE 802.17) according to an embodiment of the present invention. The control frame includes items, such as, TTL (Time To Live), Base Control, DA (Destination Address), SA (Source Address), TTL Base, Extended Control, HEC (Header Error Check), Control Type, Control Version, Control Data Unit, and FCS. The values allotted to the Control Type are listed in the table shown in FIG. 3. In this example of the present invention, the control type of "OA16: CT_OAM_ORG: OAM organization specific frame" is used.

Figure 4:
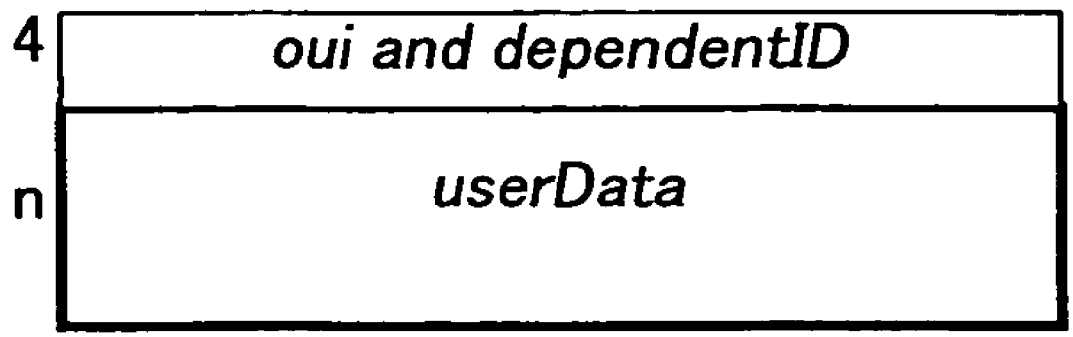
FIG. 4 is a schematic view showing an exemplary format of a control data unit inside a control frame.

FIG. 4 shows an exemplary format of a control data unit inside a control frame according to an embodiment of the present invention. In this example of the present invention, "User Data" is used.

Figure 5:
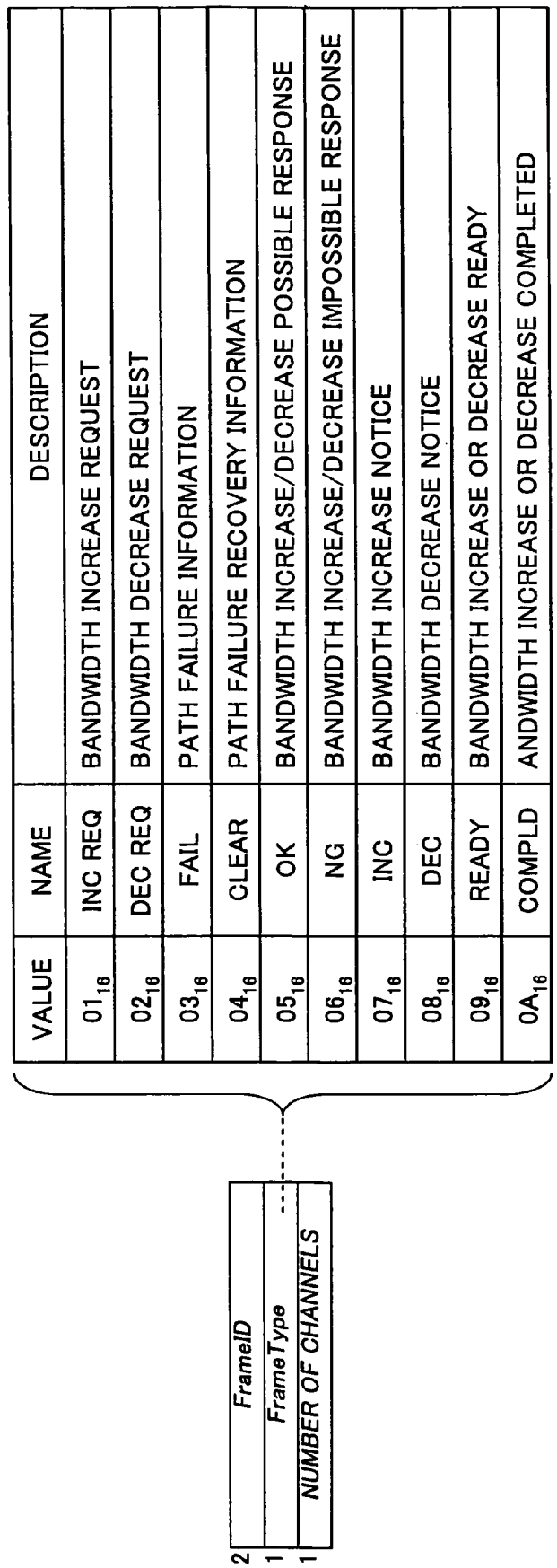
FIG. 5 is a schematic view showing an exemplary format of user data inside a control data unit.

FIG. 5 shows an exemplary format of user data inside a control data unit according to an embodiment of the present invention. The exemplary format includes a Frame ID, a Frame Type, and the Number of Channels. The values listed in the table of FIG. 5 are allotted as the frame type according to an embodiment of the present invention.

Figure 6:
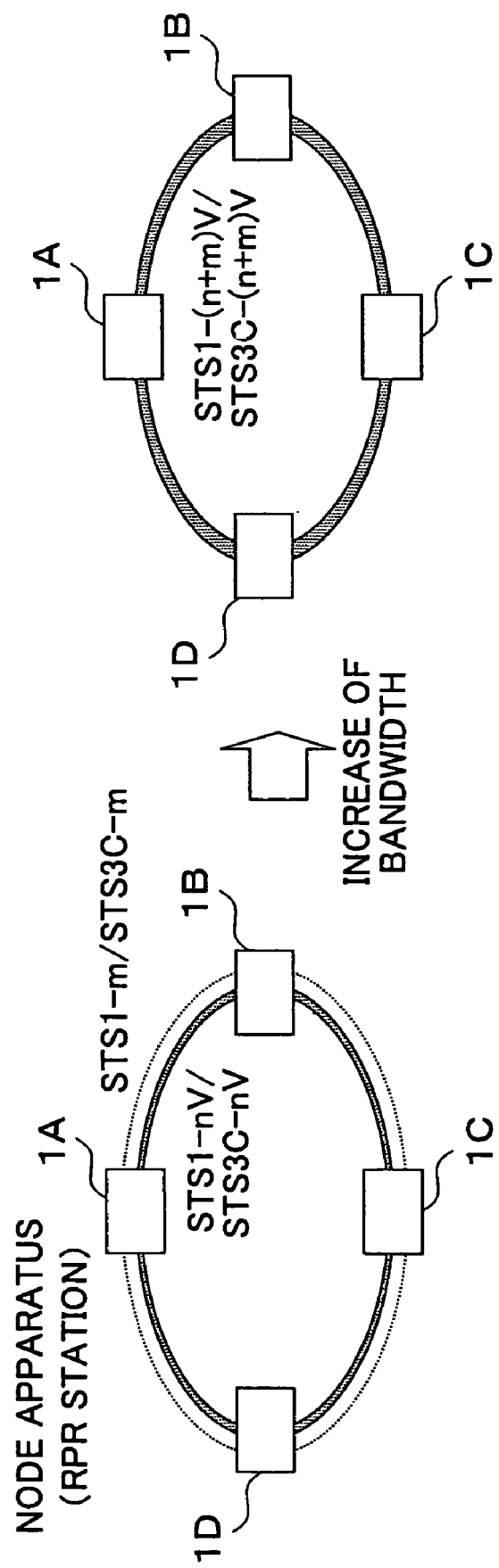
FIG. 6 is a schematic view for describing an exemplary case of increasing the bandwidth of a ring network.
Figure 7:
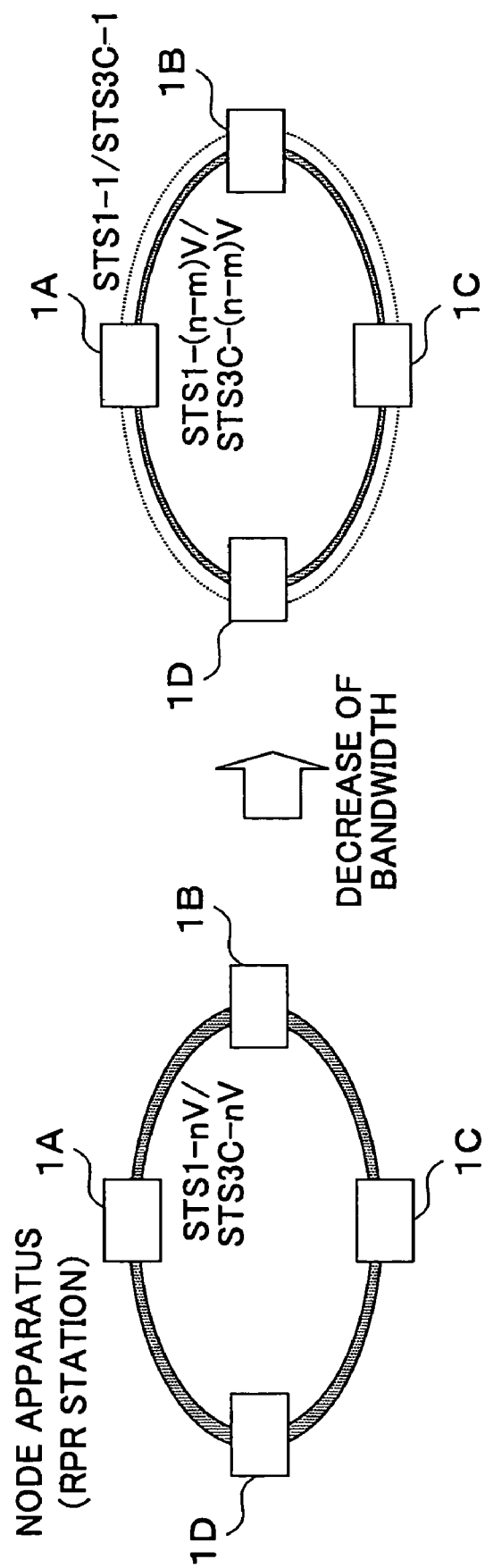
FIG. 7 is a schematic view for describing an exemplary case of decreasing the bandwidth of a ring network.
Figure 8:
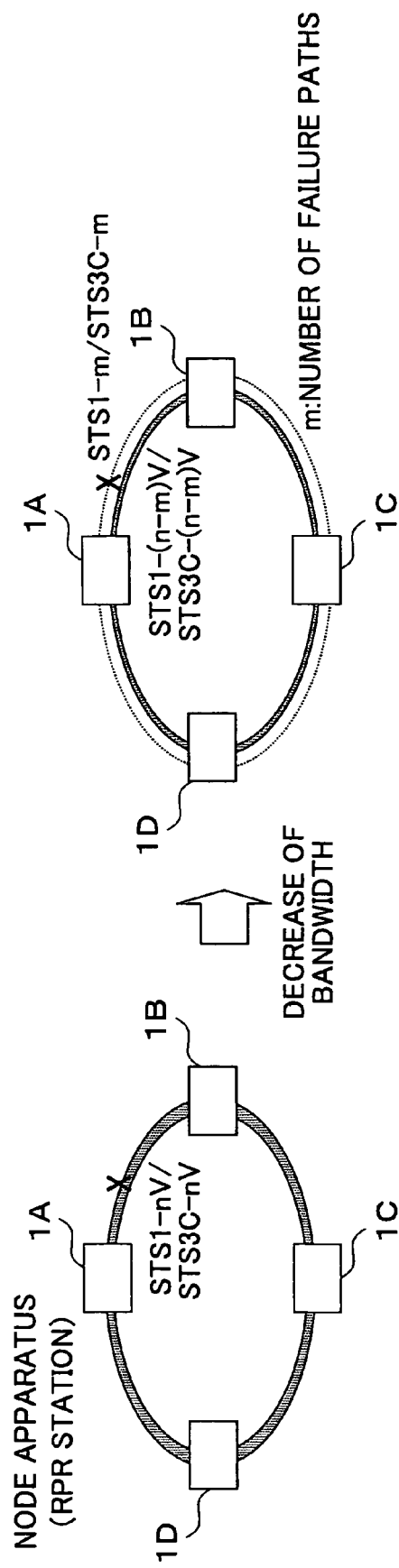
FIG. 8 is a schematic view for describing an exemplary case of decreasing the bandwidth of a ring network when there is a failure in a path of the network (Part 1)
Figure 9:
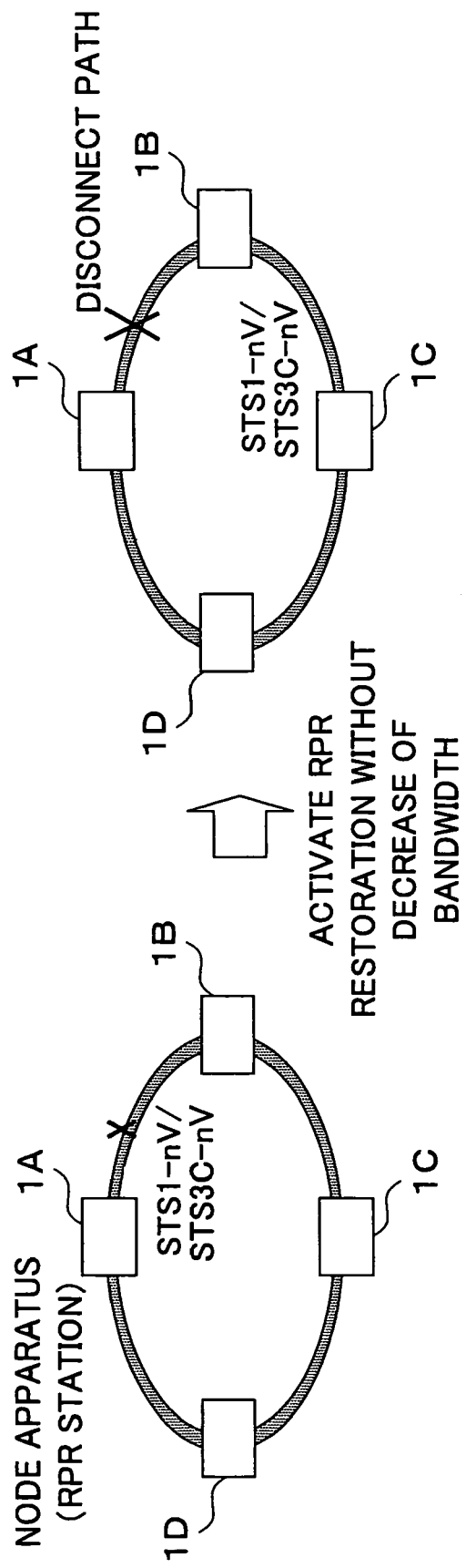
FIG. 9 is a schematic view for describing an exemplary case of decreasing the bandwidth of a ring network when there is a failure in a path of the network (Part 2)

FIG. 6 shows an exemplary case of increasing the bandwidth of the ring network. FIG. 7 shows an exemplary case of decreasing the bandwidth of the ring network. FIGS. 8 and 9 show exemplary cases of decreasing the bandwidth of a ring network when there is a failure in a path of the network. FIG. 8 shows an exemplary case of decreasing the bandwidth of the path and FIG. 9 shows an exemplary case of separating a portion of a path.

Figure 10:
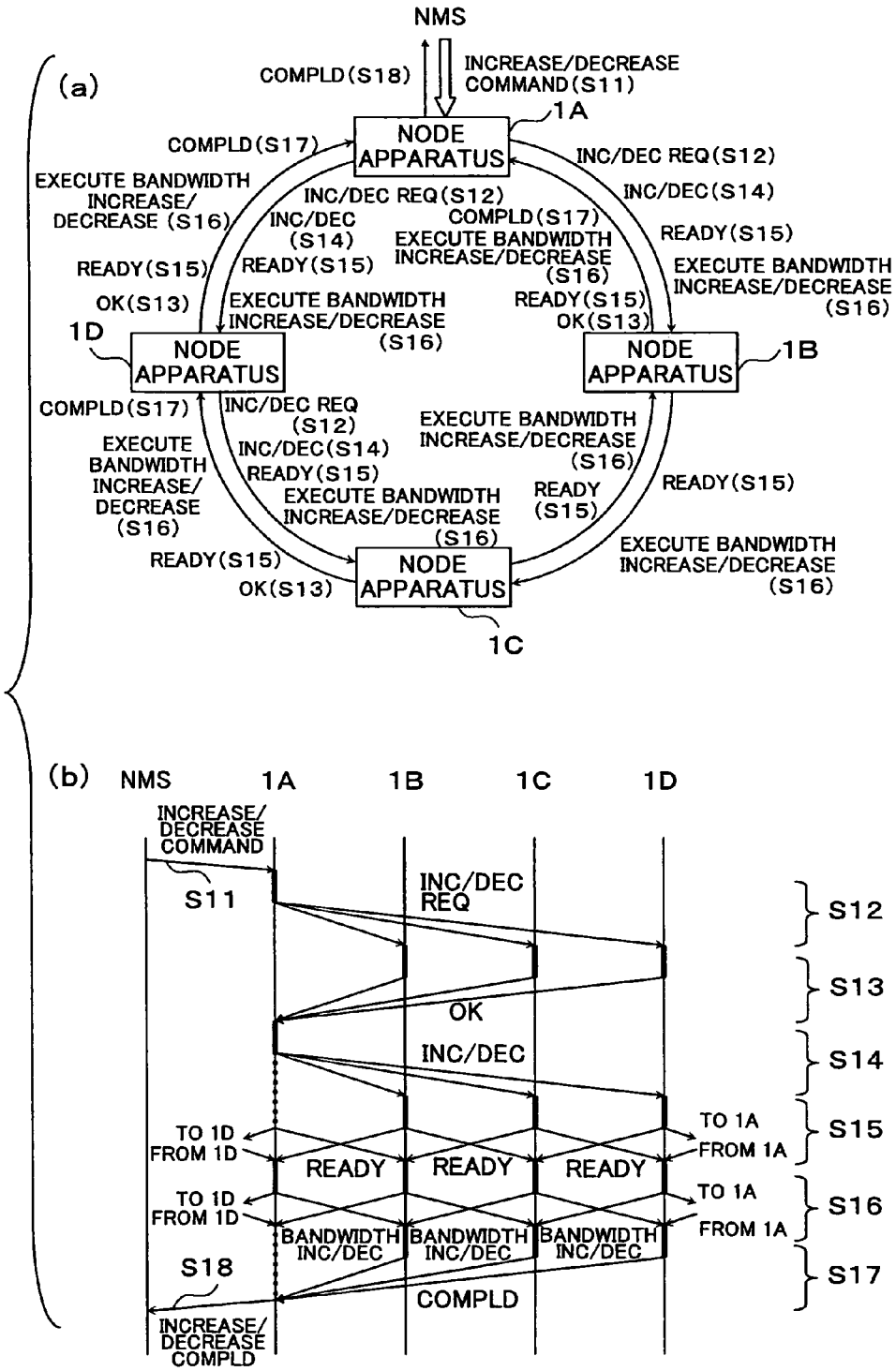
FIG. 10 is a schematic view for describing an exemplary process of increasing/decreasing the bandwidth of a ring network (Part 1)
Figure 11:
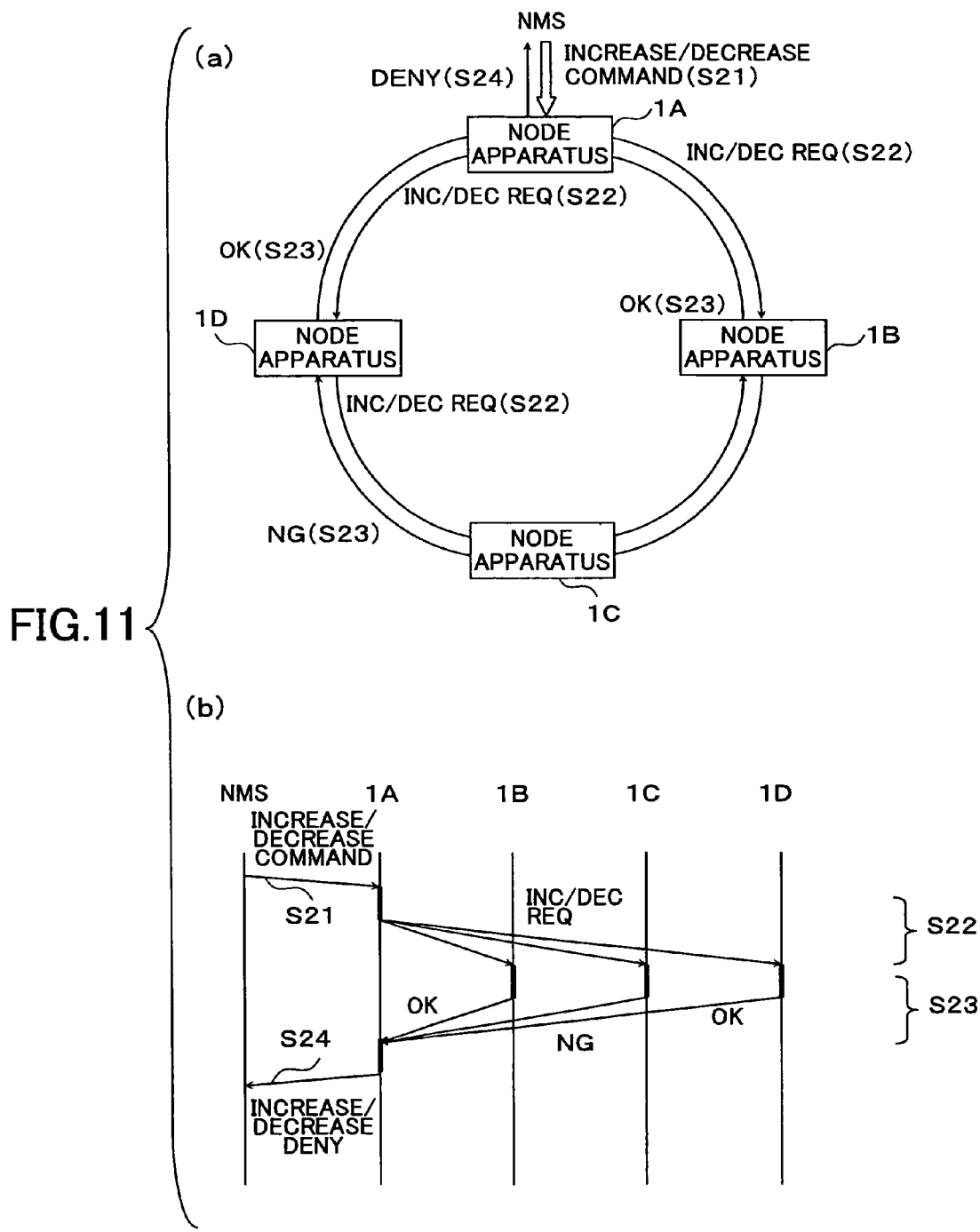
FIG. 11 is a schematic view for describing an exemplary process of increasing/decreasing the bandwidth of a ring network (Part 2)
Figure 12:
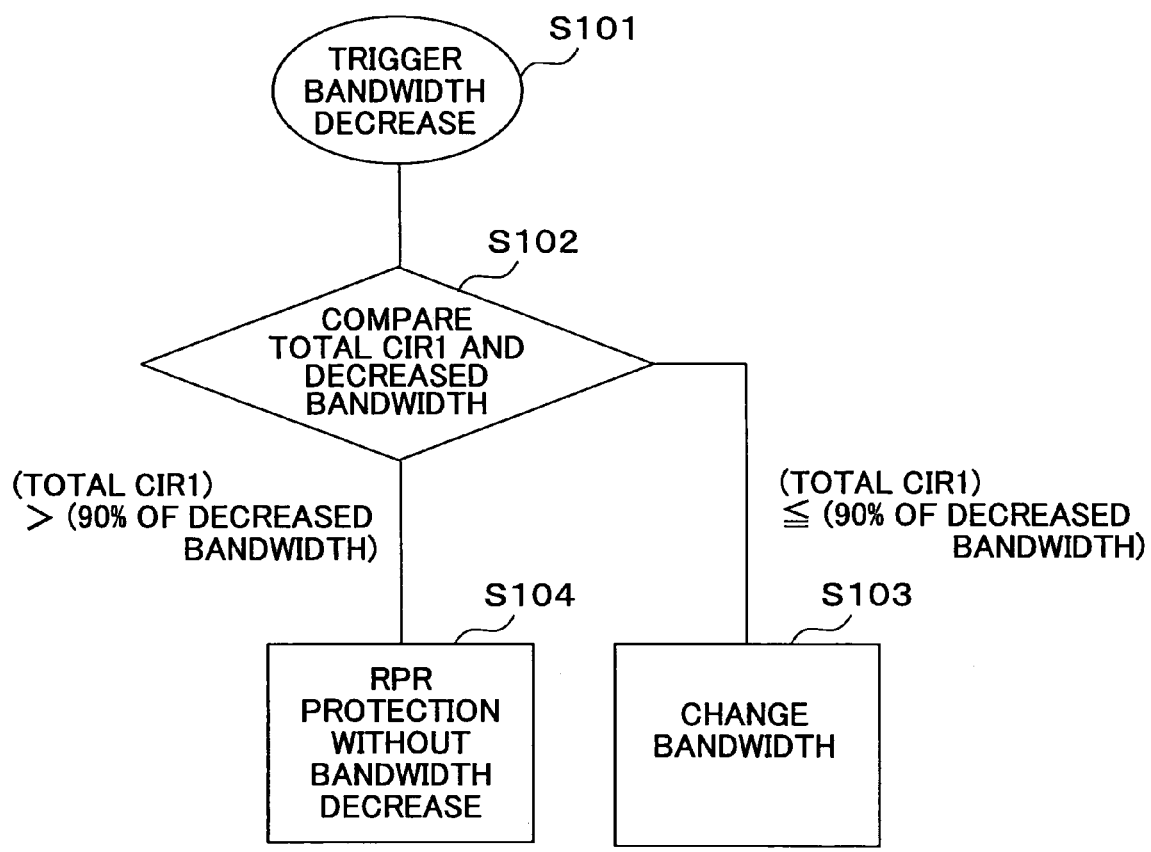
FIG. 12 is a flowchart for describing an exemplary process of determining whether to decrease the bandwidth of a ring network.
Figure 13:
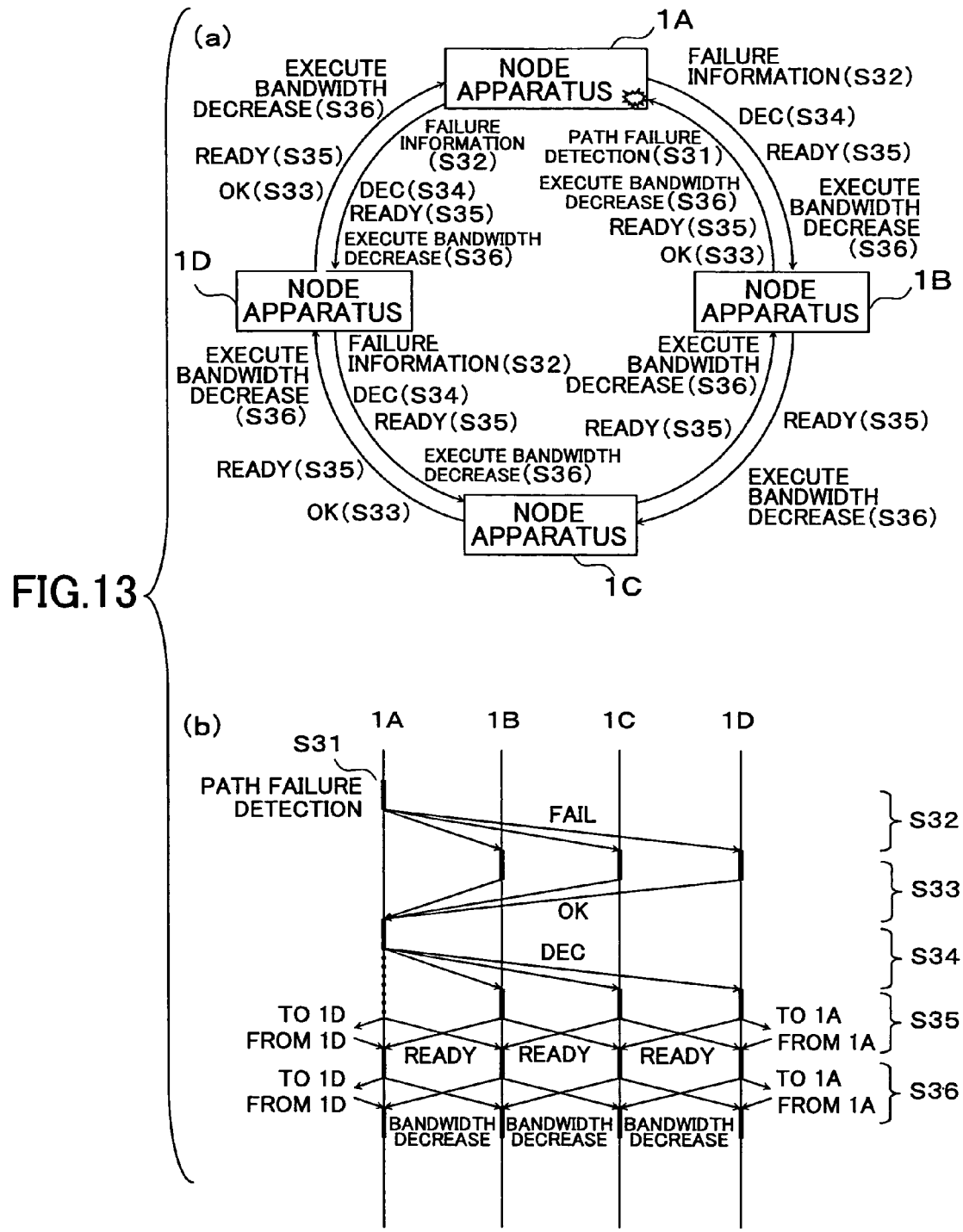
FIG. 13 is a schematic view for describing an exemplary process of decreasing the bandwidth of a ring network when there is a failure in a path of the network.

FIGS. 10-11 show an exemplary process of increasing/decreasing the bandwidth of a ring network according to an embodiment of the present invention. FIG. 12 shows an exemplary process of determining whether to decrease the bandwidth of a ring network. FIG. 13 shows an exemplary process of decreasing the bandwidth of a ring network when there is a failure in a path of the network. FIG. 14 shows an exemplary process of restoring the bandwidth of a ring network when recovering from a failure in a path of the network.

With reference with the aforementioned drawings, the process and operation according to an embodiment of the present invention are described below.

[Process of Increasing Bandwidth]

An example of increasing the ring bandwidth from "STSxx–nV" to "STSxx–(n+m) V" is described with reference to FIG. 6. It is to be noted that "STS1–nV" is a name of a SONET path, and "n" is the number of paths included in the VCG. Furthermore, although only one ring (a ring for one direction) is illustrated in FIG. 6, both the one ring and another ring (a ring for the other direction) are to have their bandwidths increased.

In FIG. 10, when the NMS sends a bandwidth increase command to the node apparatus 1A (Step S11), the node apparatus 1A transmits (broadcasts) a "bandwidth increase request" and "number of channels" to all of the node apparatuses on the ring by using the control frame (Step S12). That is, as shown in FIG. 2, when the NMS information sending section 11 in the node apparatus 1 receives a bandwidth increase command from the NMS, the RPR processing section 12 generates a control frame and sends the control frame to the VCG generating/detection section 14. Then, after the VCG generating/detecting section 14 conducts a SONET mapping process, the VCG generating/detecting section 14 sends the control frame to the ring.

Returning to FIG. 10, each of the other node apparatuses 1B-1D, having received the information including the "bandwidth increase request" and the "number of channels" from the node apparatus 1A, determines whether it is possible to increase the bandwidth of the node apparatus itself (each node apparatus except for node apparatus 1A). If the other node apparatus 1B-1D determines that the bandwidth increase is possible, the other node apparatus 1B-1D transmits (unicasts) an affirmative response "OK" to the node apparatus 1A by using the control frame, and if the other node apparatus 1B-1D determines that the bandwidth increase is impossible, the other node apparatus 1B-1D transmits (unicasts) a negative response "NG" to the node apparatus 1A by using the control frame (Step S13). That is, as shown in FIG. 2, the RPR processing section 12, upon receiving the control frame from the VCG generating/detection section 14, determines whether the bandwidth increase is possible by referring to the number of IDLE paths inside the VCG status information obtained from the VCG controlling section 13. In determining whether the bandwidth increase is possible, the RPR processing section 12 compares the "number of channels" requested to be increased and the number of IDLE paths of the node apparatus itself. In a case where the "number of IDLE paths" and the "number of channels requested to be increased" satisfy a relation where "number of IDLE paths"≧"number of channels requested to be increased", the increase of bandwidth is determined to be possible. In a case where the "number of IDLE paths" and the "number of channels requested to be increased" satisfy a relation where "number of IDLE paths"≦"number of channels requested to be increased", the increase of bandwidth is determined to be impossible. The status of the path (number of IDLE paths) is constantly monitored by the VCG generating/detecting section 14, and the status is sent from the VCG controlling section 13 to the RPR processing section 12, to thereby enable determination of the increase of bandwidth.

Returning to FIG. 10, when the node apparatus 1A receives the "OK" reply from all of the other node apparatuses 1B-1D and determines that the bandwidth increase of itself (i.e. node apparatus 1A) is possible, the node apparatus 1A transmits (broadcasts) an answer containing the "increase of bandwidth" and the "increased number of channels" to all of the other node apparatuses 1B-1D by using the control frame (Step S14). On the other hand, when the node apparatus 1A receives the reply "NG" from at least one of the other node apparatuses 1B-1D or when the node apparatus 1A determines that the bandwidth increase of itself (node apparatus 1A) is impossible, the node apparatus 1A transmits an answer "DENY" to the NMS. FIG. 11 shows an exemplary case where the increase of bandwidth is denied. In this example, the node apparatus 1A, receiving the reply "NG" from the node apparatus 1B, transmits the answer "DENY" to the NMS (Step S24). The RPR processing section 12 shown in FIG. 2 determines the possibility of bandwidth increase of the entire ring by processing the received information indicative of the possibility of bandwidth increase from the other node apparatuses 1B-1D along with processing (determining) the possibility of bandwidth increase of itself (i.e. node apparatus 1A). If the RPR processing section 12 determines that the bandwidth increase of the entire ring is possible, the RPR processing section 12 generates a control frame. If the RPR processing section 12 determines that the bandwidth increase of the entire ring is impossible, the answer "DENY" is transmitted from the NMS information sending section 11 to the upper level NMS.

Returning to FIG. 10, the node apparatus 1A and the other node apparatuses 1B-1D receiving the control frame indicating "increase of bandwidth" and the "increased number of channels" each transmits a control frame indicating "READY" to its adjacent node apparatus 1A-1D (Step S15). Each node apparatus 1A-1D, upon receiving the transmitted control frame "READY", adds a VCG member (bandwidth increase) with respect to the node apparatus (source) of the transmitted control frame (Step S16). That is, as shown in FIG. 12, the RPR processing section 12 reports the number of increased channels to the VCG controlling section 13. Accordingly, the Overhead information, which is to be changed, is sent (reported) from the VCG controlling section 13 to the VCG generating/detecting section 14. Then, in the VCG generating/detecting section 14, the setting is changed such that "CTRL=NORM" is set to "n through (m−1)(ch)"

("CTRL=NORM" previously being set to "1 through (n−1) (ch)") and "CTRL=EOS" is set to "n+m (ch)" ("CTRL=EOS" previously being set to "n (ch)"). It is to be noted that CTRL=xxx indicates a parameter included in the VCG, in which the values thereof include, for example, NORM (Normal), EOS (End Of Sequence), and DNU (Do Not Use). The process of changing the VCG to STSxx-(n+m) V (bandwidth increase) is completed in the corresponding node apparatus upon receiving the changed overhead information changed by the VCG generating/detecting section 14. When the bandwidth increase is completed, the NMS information sending section 11 sends a completion report "COMPLD" to the NMS (Step S17).

[Process of Decreasing Bandwidth (NMS Setting]

An example of decreasing the ring bandwidth from "STSxx-nV" to "STSxx-(n-m) V" is described with reference to FIG. 6.

In FIG. 10, when the NMS sends a bandwidth decrease command to the node apparatus 1A (Step S11), the node apparatus 1A transmits (broadcasts) a "bandwidth decrease request" and "number of channels" to all of the other node apparatuses 1B-1D on the ring by using a control frame (Step S12).

Each of the other node apparatuses 1B-1D, having received the information including the "bandwidth decrease request" and the "number of channels" from the node apparatus 1A determines whether it is possible to decrease the bandwidth of the node apparatus itself (each node apparatus except for node apparatus 1A). If the other node apparatus 1B-1D determines that the bandwidth decrease is possible, the other node apparatus 1B-1D transmits (unicasts) an affirmative response "OK" to the node apparatus 1A by using a control frame, and if the other node apparatus 1B-1D determines that the bandwidth decrease is impossible, the other node apparatus 1B-1D transmits (unicasts) a negative response "NG" to the node apparatus 1A by using a control frame (Step S13). That is, as shown in FIG. 2, the RPR processing section 12, upon receiving the information including the "bandwidth decrease request" and the "number of channels", calculates the ring bandwidth supposing that the bandwidth is decreased (supposed decreased bandwidth) and compares the calculated bandwidth to a CIR 1 (Committed Information Rate) bandwidth which is reserved as the rate of the guaranteed bandwidth. FIG. 12 shows a flowchart of an exemplary process of determining the decrease of bandwidth. The process begins when a bandwidth decrease is triggered (Step S101). Then, the total value of the CIR 1 and the value of the supposed decreased bandwidth are compared (Step S102). If the relation of, for example, "(Total CIR 1 Value)≦(90% of Supposed Decreased Bandwidth)" is satisfied, the decrease of bandwidth is accepted (Change Bandwidth) (Step S103). If the relation of, for example, "(Total CIR 1 Value)>(90% of Supposed Decreased Bandwidth)" is satisfied, the decrease of bandwidth is denied (RPR Protection) (Step S104).

Returning to FIG. 10, when the node apparatus 1A receives the "OK" reply from all of the other node apparatuses 1B-1D and determines that the bandwidth decrease of itself (i.e. node apparatus 1A) is possible, the node apparatus 1A transmits (broadcasts) an answer including the "decrease of bandwidth" and the "decreased number of channels" to all of the other node apparatuses 1B-1D by using a control frame (Step S14). On the other hand, when the node apparatus 1A receives the reply "NG" from at least one of the other node apparatuses 1B-1D or when the node apparatus 1A determines that the bandwidth decrease of itself (node apparatus 1A) is impossible, the node apparatus 1A transmits an answer "DENY" to the NMS (Step S24 in FIG. 11).

Then, the node apparatus 1A and the other node apparatuses 1B-1D receiving the control frame indicating "decrease of bandwidth" and the "decreased number of channels" each transmits a control frame indicating "READY" to its adjacent node apparatus 1A-1D (Step S15). Each node apparatus 1A-1D, upon receiving the transmitted control frame "READY", removes a VCG member (bandwidth decrease) with respect to the node apparatus (source) of the transmitted control frame (Step S16). That is, as shown in FIG. 2, the RPR processing section 12 reports the number of decreased channels to the VCG controlling section 13. Accordingly, the Overhead information, which is to be changed, is sent (reported) from the VCG controlling section 13 to the VCG generating/detecting section 14. Then, in the VCG generating/detecting section 14, the setting is changed such that "CTRL=NORM" is set to "1 through (n−m−1) (ch)" ("CTRL=NORM" previously being set to "1 through (n−1) (ch)"), "CTRL=IDLE" is set to "n through (n−m+1) (ch)", and "CTRL=EOS" is set to "n-m (ch)" ("CTRL=EOS" previously being set to "n (ch)"). The process of changing the VCG to STSxx-(n-m) V (bandwidth decrease) is completed in the corresponding node apparatus upon receiving the changed overhead information changed by the VCG generating/detecting section 14. When the bandwidth decrease is completed, the NMS information sending section 11 sends a completion report "COMPLD" to the NMS (Step S17).

[Exemplary Process of Bandwidth Decrease (In a case of a partial failure)]

An example of removing a channel with a defective path (path failure) from the STSxx-nV and decreasing the bandwidth to STSxx-(n-m) V ("m" indicates the number of defective paths) is described with reference to FIG. 8.

In FIG. 13, when a failure in a path (failure in the SONET layer) is detected (Step S31), the node apparatus 1A transmits (broadcasts) a "failure" and "number of channels" to all of the other node apparatuses 1B-1D (Step S32). That is, as shown in FIG. 2, when the VCG generating/detecting section 14 detects a failure in the path, the VCG controlling section 13 dispatches an interruption report to the RPR processing section 12. The RPR processing section 12, upon receiving the interruption report, generates a control frame for reporting the failure and the number of channel(s).

Returning to FIG. 13, each of the other node apparatuses 1B-1D, having received the information including the "failure" and the "number of channels" from the node apparatus 1A, determines whether it is possible to decrease the bandwidth of the node apparatus itself (each node apparatus except for node apparatus 1A). If the other node apparatus 1B-1D determines that the bandwidth decrease is possible, the other node apparatus 1B-1D transmits (unicasts) an affirmative response "OK" to the node apparatus 1A by using the control frame, and if the other node apparatus 1B-1D determines that the bandwidth decrease is impossible, the other node apparatus 1B-1D transmits (unicasts) a negative response "NG" to the node apparatus 1A by using a control frame (Step S33).

When the node apparatus 1A receives the "OK" reply from all of the other node apparatuses 1B-1D, determines that the bandwidth decrease of itself (i.e. node apparatus 1A) is possible, and confirms that the bandwidth decrease during failure is set to "YES", the node apparatus 1A transmits (broadcasts) an answer including the "decrease of bandwidth" and the "decreased number of channels" to all of the other node apparatuses 1B-1D by using a control frame (Step S34). On the other hand, when the node apparatus 1A receives the reply "NG" from at least one of the other node apparatuses 1B-1D or when the node apparatus 1A determines that the bandwidth decrease of itself (node apparatus 1A) is impossible, or when the node apparatus 1A confirms that the bandwidth decrease during failure is set to "NO", the node apparatus 1A refrains from decreasing the bandwidth and activates an RPR switching function.

Then, the node apparatus 1A and the other node apparatuses 1B-1D receiving the control frame indicating "decrease of bandwidth" each transmits a control frame indicating "READY" to its adjacent node apparatus 1A-1D (Step S35). Each node apparatus 1A-1D, upon receiving the transmitted control frame "READY", removes a VCG member (bandwidth decrease) with respect to the node apparatus (source) of the transmitted control frame (Step S36). That is, as shown in FIG. 2, the RPR processing section 12 reports the number of decreased channels to the VCG controlling section 13. Accordingly, the Overhead information, which is to be changed, is sent (reported) from the VCG controlling section 13 to the VCG generating/detecting section 14. Then, in the VCG generating/detecting section 14, "CTRL=DNU (Do Not Use)" is set to the failure detected channel. The VCG generating/detecting section 14, which also generates other paths besides the path between the node apparatus 1A and the node apparatus 1B, changes the settings ("CTRL=EOS" previously being set to "n (ch)") such that "CTRL=DNU" is set to "n to (n−m+1)" (number of fail paths) and "CTRL=EOS" is set to "n−m (ch)".

Then, in the VCG generating/detecting section 14, a state where "CTRL=NORM" is set to "1−(n−1) (ch)" and "CTRL=EOS" is set to "n (ch)" is changed to a state where "CTRL=NORM" is set to "n−(m−1) (ch)" and "CTRL=EOS" is set to "n+m (ch)". The process of changing the VCG to STSxx−(n−m) V (bandwidth decrease) is completed in the corresponding node apparatus upon receiving the changed overhead information changed by the VCG generating/detecting section 14.

[Exemplary Process of Bandwidth Restoration]

An example of a case where the node apparatus 1A detects the restoration (recovery) of the failure of the node apparatus 1B is described with reference to FIG. 14.

In FIG. 14, when the node apparatus 1A detects the restoration of a path failure (Step S41) the node apparatus 1A transmits (broadcasts) "CLEAR" information and "number of channels" to all of the other node apparatuses 1B-1D by using a control frame (Step S42). That is, when the VCG generating/detecting section 14 detects a restoration (recovery) of a failure in a path, the VCG controlling section 13 dispatches an interruption report to the RPR processing section 12. The RPR processing section 12, upon receiving the interruption report, generates a control frame for reporting the "CLEAR" information and the "number of channels".

Returning to FIG. 14, each of the other node apparatuses 1B-1D, having received the information including "CLEAR" and the "number of channels" from the node apparatus 1A, determines whether it is possible to restore its corresponding path that was disconnected (separated) during failure. If the other node apparatus 1B-1D determines that the restoration is possible, the other node apparatus 1B-1D transmits (unicasts) an affirmative response "OK" to the node apparatus 1A by using a control frame, and if the other node apparatus 1B-1D determines that the restoration is impossible, the other node apparatus 1B-1D transmits (unicasts) a negative response "NG" to the node apparatus 1A by using a control frame (Step S43). That is, the VCG controlling section 13 determines whether the disconnected (separated) path is in an "CTRL=DNU" state and whether there is any path that is in an "CTRL=DNU" state at the reception side.

Returning to FIG. 14, when the node apparatus 1A receives the "OK" reply from all of the other node apparatuses 1B-1D and determines that the restoration of the disconnected (separated) path is possible, the node apparatus 1A transmits (broadcasts) an answer information the "increase of bandwidth" and the "increased number of channels" to all of the other node apparatuses 1B-1D by using a control frame (Step S44). On the other hand, when the node apparatus 1A receives the reply "NG" from at least one of the other node apparatuses 1B-1D or when the node apparatus 1A determines that the restoration of its' corresponding path (path corresponding to node apparatus 1A is impossible, the node apparatus 1A refrains from restoring the bandwidth.

Then, the node apparatus 1A and the other node apparatuses 1B-1D receiving the control frame indicating "increase of bandwidth" each transmits a control frame indicating "READY" to its adjacent node apparatus 1A-1D (Step S45). Each node apparatus 1A-1D, upon receiving the transmitted control frame "READY", restores a VCG member (bandwidth restoration) with respect to the node apparatus (source) of the transmitted control frame (Step S46). That is, as shown in FIG. 2, the RPR processing section 12 reports the number of restored channels to the VCG controlling section 13. Accordingly, the Overhead information, which is to be changed, is sent (reported) from the VCG controlling section 13 to the VCG generating/detecting section 14. Then, the VCG generating/detecting section 14 changes the settings of the restored channel (previously set as "CTRL=DNU") to "CTRL=NORM" or "CTRL=EOS". The process of changing the VCG to STSxx−nV (bandwidth restoration) is completed in the corresponding node apparatus upon receiving the changed overhead information changed by the VCG generating/detecting section 14.

Further, the present invention is not limited to these embodiments, but variations and modifications may be made without departing from the scope of the present invention.

The present application is based on Japanese Priority Application No. 2005-282096 filed on Sep. 28, 2005, with the Japanese Patent Office, the entire contents of which are hereby incorporated by reference.

The invention claimed is:

1. A method for controlling a physical bandwidth of a ring-based network by employing a ring application of a data link layer that operates in a physical layer, the method comprising:
   a) generating a first control frame;
   b) requesting each of a plurality of node apparatuses included in the ring-based network to confirm whether the bandwidth can be changed by transmitting the first control frame to all of the plural node apparatuses included in the ring-based network;
   c) generating a second control frame;
   d) instructing each of the plural node apparatuses to prepare for the bandwidth change by transmitting the second control frame to all of the plural node apparatuses upon receiving a confirmation that the bandwidth can be changed from all of the plural node apparatuses;
   e) generating a third control frame;
   f) reporting that the preparation for the bandwidth change is completed by transmitting the third control frame to all of the plural node apparatuses; and
   g) changing the bandwidth by using a bandwidth changing function of the ring application upon receiving the third control frame reporting the completion of the preparation for the bandwidth change.

2. The method as claimed in claim 1, wherein the request of step b) is executed in accordance with a command from a network management system connected to the ring-based network, wherein the completion of the bandwidth change in step g) is reported to the network management system.

3. The method as claimed in claim 1, wherein the bandwidth change includes an increase of the bandwidth, wherein the bandwidth can be increased if the bandwidth requested to be increased is less than the bandwidth that is unused in the ring-based network, wherein the bandwidth cannot be increased if the bandwidth requested to be increased is greater than the bandwidth that is unused in the ring-based network.

4. The method as claimed in claim 1, wherein the bandwidth change includes a decrease of the bandwidth, wherein the bandwidth can be decreased if it is determined that predetermined bandwidth will be available after the bandwidth is decreased, wherein the bandwidth cannot be decreased if it is determined that the predetermined bandwidth will be unavailable after the bandwidth is decreased.

5. The method as claimed in claim 1, wherein the request of step b) is executed when a failure is detected in the ring-based network.

6. The method as claimed in claim 5, wherein an RPR switching function is activated in a case where the bandwidth cannot be decreased when the failure is detected in the ring-based network.

7. The method as claimed in claim 1, wherein the request of step b) is executed when a recovery of a failure is detected in the ring-based network.

8. The method as claimed in claim 1, wherein the physical bandwidth of the ring-based network includes at least one of a SONET bandwidth and a SDH bandwidth.

9. The method as claimed in claim 1, wherein the bandwidth changing function of the ring application includes an RPR function, wherein the first, second, and third control frames include an RPR control frame.

10. A node apparatus used for controlling a physical bandwidth of a ring-based network including a plurality of node apparatuses by employing a ring application of a data link layer that operates in a physical layer, the node apparatus comprising:

a generating part for generating first, second, and third control frames;

a requesting part for requesting each of the plural node apparatus included in the ring-based network to confirm whether the bandwidth can be changed by transmitting the first control frame to all of the plural node apparatuses included in the ring-based network;

an instructing part for instructing each of the plural node apparatuses to prepare for the bandwidth change by transmitting the second control frame to all of the plural node apparatuses upon receiving a confirmation that the bandwidth can be changed from all of the plural node apparatuses;

a reporting part for reporting that the preparation for the bandwidth change is completed by transmitting the third control frame to all of the plural node apparatuses; and a changing part for changing the bandwidth by using a bandwidth changing function of the ring application upon receiving the third control frame reporting the completion of the preparation for the bandwidth change.

* * * * *